United States Patent
Elkins, II et al.

(10) Patent No.: US 7,197,214 B2
(45) Date of Patent: Mar. 27, 2007

(54) METHODS AND APPARATUS FOR FACILITATING CABLE LOCATING

(75) Inventors: Robert B. Elkins, II, Hickory, NC (US); Lars K. Nielsen, Denver, NC (US); James P. Luther, Hickory, NC (US); Thomas Theuerkorn, Hickory, NC (US); William C. Hurley, Hickory, NC (US); William S. Jackman, Hickory, NC (US); Michael J. Ott, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/112,661

(22) Filed: Apr. 22, 2005

(65) Prior Publication Data

US 2005/0259930 A1 Nov. 24, 2005

Related U.S. Application Data

(63) Continuation-in-part of application No. 10/852,427, filed on May 24, 2004, now Pat. No. 7,127,143.

(51) Int. Cl.
*G02B 6/44* (2006.01)
*G02B 6/50* (2006.01)
*G02B 6/00* (2006.01)

(52) U.S. Cl. .................. 385/100; 385/102; 385/109; 385/139

(58) Field of Classification Search .............. None
See application file for complete search history.

(56) References Cited

U.S. PATENT DOCUMENTS

| 4,884,863 | A | 12/1989 | Throckmorton ............ 350/96.2 |
| 4,961,623 | A | 10/1990 | Midkiff et al. ............ 350/96.2 |
| 5,004,315 | A | 4/1991 | Miyazaki ................. 350/93.15 |
| 5,042,901 | A | 8/1991 | Merriken et al. ........... 385/135 |
| 5,121,458 | A | 6/1992 | Nilsson et al. ............. 385/100 |
| 5,125,060 | A | 6/1992 | Edmundson ............... 385/100 |
| 5,210,812 | A | 5/1993 | Nilsson et al. ............. 385/100 |
| 5,440,665 | A | 8/1995 | Ray et al. ................. 385/135 |
| 5,528,718 | A | 6/1996 | Ray et al. ................. 385/136 |
| 5,636,305 | A | 6/1997 | Warner et al. ............. 385/100 |
| 5,657,413 | A | 8/1997 | Ray et al. ................. 385/139 |

(Continued)

FOREIGN PATENT DOCUMENTS

DE 3537684 4/1987

(Continued)

OTHER PUBLICATIONS

Tyco Electronics Raychem Product Sheet, FITS FOSC—Factory Installed Termination System for Fiber Optic Cable Splices, 1999, 2 pages, no month.

(Continued)

*Primary Examiner*—Sung Pak
(74) *Attorney, Agent, or Firm*—Keith A. Roberson

(57) ABSTRACT

A method of laying an at least partially buried fiber optic cable includes placing a fiber optic cable with at least one associated alternating electromagnetic field emitting locating transponder (AEFELT) underground such that at least one AEFELT is buried underground.

20 Claims, 9 Drawing Sheets

U.S. PATENT DOCUMENTS

| | | | |
|---|---|---|---|
| 5,778,122 A | 7/1998 | Giebel et al. | 385/55 |
| 5,892,870 A | 4/1999 | Fingler et al. | 385/59 |
| 5,910,776 A | 6/1999 | Black | 340/825.35 |
| RE36,592 E | 2/2000 | Giebel et al. | 385/100 |
| RE37,028 E | 1/2001 | Cooke et al. | 385/112 |
| 6,466,725 B2 | 10/2002 | Battey et al. | 385/135 |
| 6,619,697 B2 | 9/2003 | Griffioen et al. | 285/126.1 |
| 6,621,975 B2 | 9/2003 | Laporte et al. | 385/135 |
| 6,777,617 B2 | 8/2004 | Berglund et al. | 174/92 |
| 6,784,802 B1 | 8/2004 | Stanescu | 340/687 |
| 6,847,856 B1 | 1/2005 | Bohannon | 700/115 |
| 2002/0158120 A1* | 10/2002 | Zierolf | 235/375 |
| 2004/0156601 A1* | 8/2004 | Koyasu et al. | 385/100 |
| 2004/0184747 A1* | 9/2004 | Koyasu et al. | 385/101 |
| 2005/0220426 A1* | 10/2005 | Durrant et al. | 385/88 |
| 2005/0224585 A1* | 10/2005 | Durrant et al. | 235/492 |

FOREIGN PATENT DOCUMENTS

| | | |
|---|---|---|
| EP | 1455550 A2 | 9/2004 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 04-039483 A | 2/1992 |
| JP | 2001099946 A * | 4/2001 |
| JP | 2001099946 A | 4/2001 |
| JP | 2001116968 | 4/2001 |
| JP | 2003148653 | 5/2003 |
| WO | WO2004030154 A2 | 4/2004 |
| WO | WO2004/072989 A1 | 8/2004 |

OTHER PUBLICATIONS

U.S. Appl. No. 2004/0184747 A1, Sep. 23, 2004.

Cable/Circuit Location Equipment, Electronic Omni Marker™ no date.

* cited by examiner

METHODS AND APPARATUS FOR FACILITATING CABLE LOCATING

CROSS REFERENCE TO RELATED APPLICATION

This application is a continuation-in-part (CIP) of U.S. patent application Ser. No. 10/852,427 filed May 24, 2004 now U.S. Pat. No. 7,127,143 titled Distributed Cable Assembly Having Overmolded Mid-span Access Location, which is hereby incorporated in its entirety.

BACKGROUND OF THE INVENTION

1. Field of the Invention

The present invention relates generally to a fiber optic cable and, more particularly, to methods and apparatus for facilitating the locating of a buried fiber optic cable.

2. Description of the Related Art

Optical fibers are used for a variety of applications including voice communication, data transmission and the like. With the ever-increasing need for connecting remote locations to a fiber optic distribution cable, more efficient methods of performing a mid-span access of a distribution cable are required. Typically, to facilitate performing a mid-span access in the field, hand holes are dug and a horizontal bore is made connecting the hand holes. Optionally, a conduit may be placed in the bore. The cable is passed through the bore or conduit and slack lengths of cable are provided in the hand holes. A field technician removes a portion of the cable sheath at a slack location along the installed distribution cable. Once the sheath is removed, the technician accesses pre-selected optical fibers, severs the pre-selected optical fibers and removes a length of the optical fibers from the distribution cable. The removed length of distribution optical fiber provides the field technician with adequate length for splicing. A cable that includes a lesser amount of fibers than the distribution cable, commonly termed a "drop cable," is spliced to the optical fibers removed from the distribution cable. After all splicing is complete, the access location is oftentimes covered using an enclosure designed to protect the splices and the exposed section of the distribution cable. This time consuming process is typically accomplished by a highly skilled field technician at a significant cost.

Several approaches have been developed to overcome the disadvantages of accessing optical fibers in the field. In one approach, the splicing of drop cables to the distribution cable is performed at a factory during the manufacturing of the cable. The cable, including the main cable, drop cables and associated splice closures, are assembled and wound onto a cable reel to be delivered to an installation site. Although the need for slack storage in the field is decreased, hand holes are still beneficial to the construction of a network. However, the conventional method of laying cable using slack storage in hand holes can be improved as explained below.

It would be desirable to facilitate locating a cable in the field having factory fabricated splices and splice enclosures, and then putting the factory fabricated splices in a hand hole. Also, as detailed below, there are other benefits to facilitating the locating of a buried cable.

BRIEF SUMMARY OF THE INVENTION

In one aspect of the present invention, a method of laying an at least partially buried fiber optic cable includes placing a fiber optic cable with at least one associated alternating electromagnetic field emitting locating transponder (AEFELT) underground such that at least one AEFELT is buried underground.

Another aspect relates to a fiber optic cable assembly which includes a distribution cable including a plurality of optical fibers and having at least one predetermined mid-span access location positioned along the length of the distribution cable, at least one optical fiber of the distribution cable accessed and terminated from the distribution cable at the mid-span access location, and an alternating electromagnetic field emitting locating transponder (AEFELT) positioned at the accessed optical fiber, the AEFELT configured to be operable at least four feet underground.

In yet another aspect, a method of facilitating a locating of a fiber optic cable slack storage location is provided. The method includes creating a cable slack storage location by creating at least one loop of cable, and placing an alternating electromagnetic field emitting locating transponder at the slack storage location.

In still another aspect, a method of updating location information is provided. The method includes receiving an original target location of a desired cable including an alternating electromagnetic field emitting locating transponder (AEFELT), locating the cable AEFELT at an actual location, and updating the location information when the actual location was not the received original target location.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. Like reference numbers refer to like elements throughout the various drawings.

In some embodiments, a fiber optic cable, e.g., a preterminated cable, comprises a plurality of access locations at spaced apart locations along the cable length, thus providing multiple access locations, or tap points, for joining at least one drop cable to the distribution cable in the field. The exemplary preterminated fiber optic distribution cable may be wound upon a reel for distribution and deployment in buried applications, such as within a bore or conduit. The preterminated cable system is manufactured in a factory, thus eliminating the need for first installing a fiber optic cable and then performing a mid-span access, for example at a pedestal in the field. The preterminated cable of the present invention offers communication service providers factory prepared, low profile access locations that are protected during the cable installation process and are removable once the cable is installed. Once installed, the at least one preterminated optical fiber may be quickly coupled to a drop cable or pigtail via a fusion or mechanical splice, and mated to any desired closure type. In one embodiment, the predetermined mid-span access location is associated with an alternating electromagnetic field emitting locating transponder (AEFELT). Therefore, as explained in greater detail below, the mid-span access point is locatable after being buried.

Figure 1:
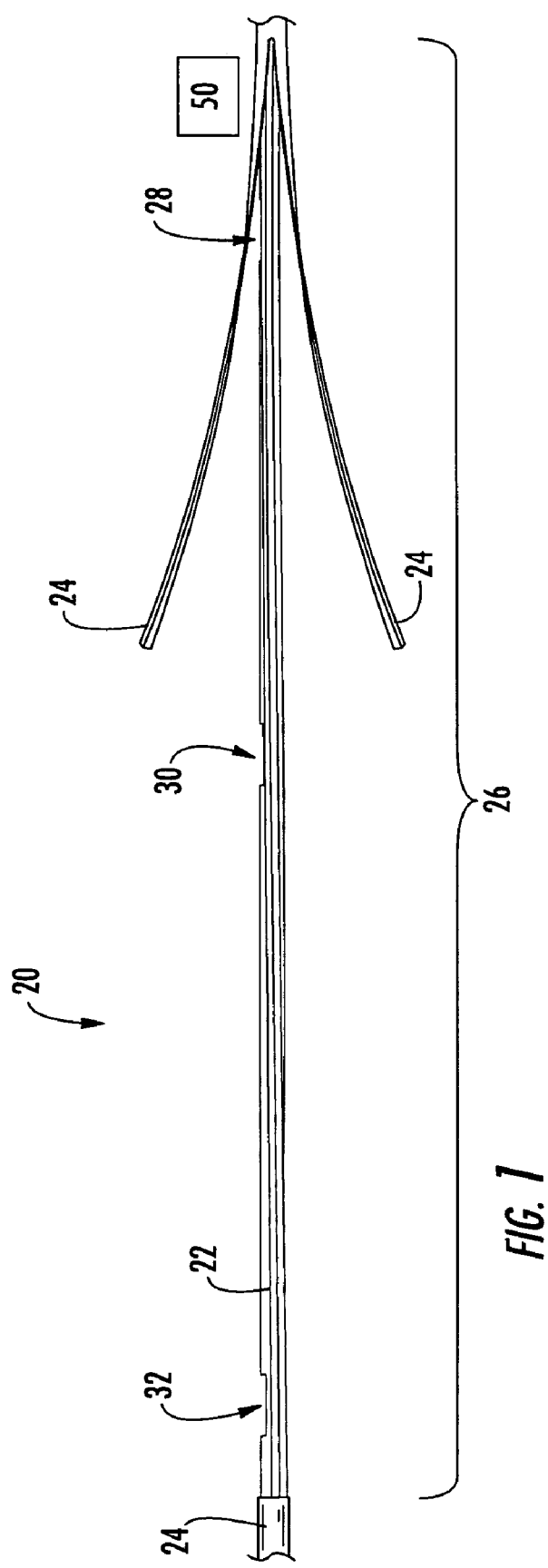
FIG. 1 is a perspective view of a fiber optic distribution cable having a predetermined access location.

Referring now to FIG. 1, the preterminated fiber optic distribution cable according to the present invention includes a fiber optic distribution cable 20 including at least one buffer tube 22 disposed within a cable sheath 24. As is known by those skilled in the art, the distribution cable 20 as shown and described herein may include any known fiber optic cable having a fiber count greater than that of a drop cable and comprising at least one buffer tube, such as an ALTOS® dielectric cable available from Corning Cable Systems LLC of Hickory, N.C. The ALTOS® dielectric cable, for example, is a lightweight cable designed for both conduit (buried) and aerial (lashed) installations. The distribution cable 20 may be of a loose tube design that provides stable performance over a wide range of temperatures and is compatible with any telecommunications grade optical fiber. The distribution cable 20 may comprise a water-blocking compound, such as a gel, to prevent water penetration that may lead to optical fiber damage. However, the distribution cable 20 may also be a "dry-tube" cable. In exemplary embodiments, the distribution cable 20 is flexible, easy to route and has no preferential bend.

To achieve a mid-span, low profile access location, a section of the cable sheath (not shown) is severed and removed to expose the buffer tubes 22 within the distribution cable 20. The exposed length of the cable may vary. However, in one embodiment, the length ranges between about 14 and 16 inches. On the downstream end of the exposed cable length, one or more longitudinally extending slits are made in the cable sheath 24. The cable sheath 24 is then peeled back, or flared, to allow for an additional length of the buffer tubes 22 to be exposed. The cable sheath 24 may be slit using a buffer tube access tool operable for slitting the cable sheath 24 longitudinally into two substantially equal halves without damaging the buffer tubes 22 disposed within the cable 20. The slit cable sheath 24 length may also vary. However, in one embodiment, the slit length ranges between about 12 and 14 inches. Thus, the total amount of buffer tube 22 exposed may range between about 25 and 30 inches. As described below, the exposed buffer tube length allows for about 20–30 inches of optical fiber to be withdrawn from the buffer tube 22 for subsequent splicing, thereby providing sufficient slack fiber length for more than one splice attempt.

For a given access location 26, the appropriate buffer tube 22 may be accessed in at least two, and as shown three places, using a standard No-Slack Optical Fiber Access Tool (NOFAT) available from Corning Cable Systems LLC of Hickory, N.C. The NOFAT tool is suitable for use in locations in which a relatively small amount of cable slack is available and the buffer tubes 22 remain wrapped around the central member. The NOFAT tool provides a guide that allows a scalpel to slice a section of a buffer tube 22 off without cutting completely through the buffer tube 22 or the optical fibers disposed within the buffer tube 22. The NOFAT tool is compatible with standard Corning Cable Systems ALTOS® Cable buffer tube sizes.

As shown and described herein, three access locations, typically about 10–15 inches apart, are cut on the appropriate buffer tube 22. As will be readily understood by those skilled in the art, at least three access locations are specifically advantageous for removing one or more optical fibers from a buffer tube filled with a water-blocking gel. Starting at the first buffer tube access point 28, a predetermined number of 250 µm optical fibers are accessed and severed. In a buffer tube 22 comprising twelve optical fibers, for example, four or eight optical fibers may be preterminated. The remaining optical fibers disposed within the buffer tube 22 remain intact and continue through the distribution cable 20. The severed optical fibers are then fished out of the middle, or second access point 30, on the same buffer tube, exposing about 12–14 inches of fiber length. The same optical fibers are then fished out of the buffer tube 22 a second time at the third access point 32 adjacent to the upstream end of the cable sheath 24, thereby exposing a total fiber length of about 20–30 inches. The minimum bend radius of the optical fibers is not violated during the process of fishing-out the fibers. After removing the optical fibers from the buffer tube 22, any water-blocking gel (if present within the buffer tube 22) is cleaned off of the entire exposed length of the optical fibers.

Appropriate buffer tubes 22 and optical fibers may be located within the cable by color-coded markings or colored tubing used in many conventional cable designs. Access locations may be placed along a distribution cable at locations in which inflection points, sometimes called reverse oscillation of lay points, occur. An inflection point is a point along a cable at which the helical winding of the buffer tubes switches its winding direction, and typically occurs about every meter along the length of the cable. The inflection points along a distribution cable 20 may be marked on the cable sheath 24. The inflection points allow enough buffer tube slack to raise the buffer tube slightly and insert the NOFAT tool. In accordance with one aspect of the invention, an AEFELT 50 is associated with access location 26. In one embodiment, AEFELT 50 is a commercially available Radio Frequency Identification (RFID) tag configured to be locatable at least about four feet below the ground surface, and is attached to cable 20 at access location 26.

Figure 2:
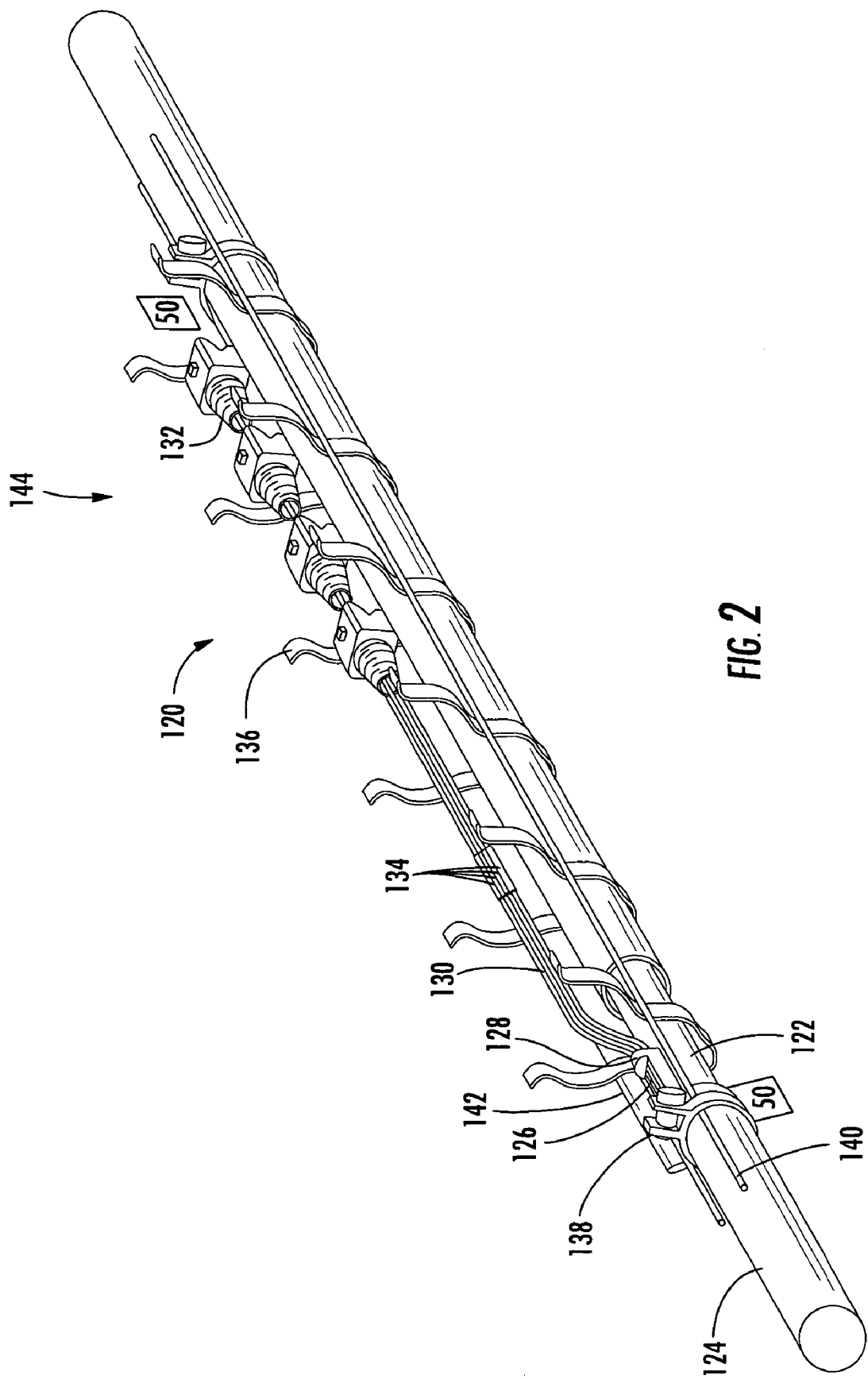
FIG. 2 is a perspective view of one embodiment of a pre-connectorized fiber optic distribution cable.

Referring now to FIG. 2, a perspective view of one embodiment of a fiber optic cable, for example a pre-connectorized distribution cable, is shown. The pre-connectorized fiber optic distribution cable 120 includes at least one tubular body 122 disposed within a cable sheath 124. The distribution cable as shown and described herein may include any known fiber optic cable having a fiber count greater than that of an associated drop cable and comprising at least one tubular body 122. The tubular body 122 may include, but is not limited to, one or more buffer tubes, a monotube or a tube formed from a water-swellable tape. In one particular example, the distribution cable is an ALTOS® dielectric cable available from Corning Cable Systems LLC of Hickory, N.C. The ALTOS® dielectric cable, for example, is a lightweight cable designed for both conduit (buried) and aerial (lashed) installations. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a monotube. The distribution cable may be of a loose tube design that provides stable performance over a wide range of temperatures and is compatible with any telecommunications grade optical fiber. The distribution cable may comprise a water-blocking compound, such as a gel, to prevent water penetration that may lead to optical fiber damage. However, the distribution cable may also be a "dry-tube" cable. In exemplary embodiments, the distribution cable is flexible, easy to route and has no preferential bend.

The exposed and preterminated 250 μm optical fibers 126 are shown being routed through an optical fiber transition piece 128 that is secured to 900 μm protective tubes 130. In exemplary embodiments, the transition piece 128 and the protective tubes 130 are assembled and secured together using an epoxy material prior to inserting the optical fibers 126 into the protective tubes 130. In one method of assembly, an optical fiber length of about 9 to 15 inches is withdrawn from the tubular body 122, routed through an optical fiber opening (not shown) formed in the transition piece 128, and inserted into the protective tubes 130. The transition piece 128 may be secured to the tubular body 122 or to a structural member of the distribution cable, for example, at least one strength member (not shown).

The transition piece 128 may be rigid or somewhat flexible to permit the transition piece 128 to bend slightly to conform to the curvature of the tubular body 122 or other structure to which it is attached. The transition piece 128 is positioned to cover the exit point of optical fibers 126 and to protect the open portion of the tubular body 122. In one embodiment, the transition piece 128 is snapped over the region of the tubular body 122 where preterminated optical fibers 126 extend from tubular body 122. Once all of the optical fibers 126 have been routed, the opening provided in the transition piece 128 may be filled with a sealing material, such as a silicone elastomer or epoxy material, to seal the transition point, prevent torque in the transition piece 128 and prevent any water-blocking gel that may be present from leaking out of the tube.

In a particular embodiment, the transition piece 128 is a molded piece defining an optical fiber opening for receiving the optical fibers exiting from the tubular body 122.

In one embodiment, the preterminated optical fibers 126 may be directly connectorized. This process involves mounting connectors directly on to the ends of the preterminated optical fibers 126 withdrawn from the tubular body 122, resulting in an optical fiber length of about 9 to 15 inches. However, in exemplary embodiments and specifically in the embodiments shown throughout the figures, the preterminated optical fibers 126 are spliced, preferably fusion spliced, to buffered or jacketed pigtails having a predetermined length in order to provide a total optical fiber length of at least about 20 inches. In the spliced configuration, at least about a 10 inch length of optical fiber upon which a connector 132 has been previously mounted (i.e., a pigtail) may be spliced in the factory to the withdrawn length of optical fiber 126. The splice points may be protected using splice protectors 134, which are operable for holding and protecting the splice connection between the end of the preterminated optical fiber and the pigtail. The splice protectors 134 define a lengthwise extending passageway and are typically formed of a plastic material. One advantage of factory-installing spliced pigtails is that all connectors should have substantially consistent optical properties.

In both spliced and direct connectorized embodiments, connector types may include, but are not limited to, SC, LC, FC, ST, SC/DC, MT-RJ, MTP and MPO ferrules. Whether or not the optical fibers 126 are individual fibers or fiber ribbons does not limit the connector type, however, in various embodiments, MT-RJ, MTP and MPO ferrules may be used when the distribution cable comprises fiber ribbons.

A plurality of resilient cable clips 136 may be positioned at desired intervals along the length of the access location. The cable clips 136 are operable for holding the distribution cable and a connector monotube and centering the cable assembly within an over-molding tool, as described below. The cable clips 136 may be added to the cable mid-span at any time during the assembly process. The cable clips 136 are typically formed of a thin metal material and define a channel for receiving the connector monotube.

The pre-connectorized cable 120 further includes a cable clamp 138 positioned at each end of the access location and over the cable sheath 124. The cable clamps 138 protect the cable assembly by providing resistance to lateral and torsional forces that the assembly may be exposed to. The cable clamps 138 may further be operable for securing one end of at least one ripcord 140. The cable clamps 138 provide an anchor and allow the at least one ripcord to be extracted opposite the clamped end in order to remove any heat shrinkable material or protective over-layer. The cable clamps 138 may be secured on the distribution cable by any conventional fastener, such as a screw, rivet or clamp. An AEFELT 50 may be located at a mid-span access point 142 and/or a network access point 144. As used herein, and with reference to connectorized cable assemblies, "mid-span access point(s)" (i.e, "MAP") refers to the location(s) where optical fibers are accessed from the cable and "network access point(s)" refers to the location(s) of the connectors. Also, as used herein, the term "at" refers both to being exactly at a location and being within an operable distance from the location. Operable distance meaning that during a normal dig operation centered around the RFID tag location, one would uncover the exact location. For example, a RFID tag is located a foot away from the MAP point and when digging to gain access to the RFID tag, the MAP point is either uncovered by the digging process or is easily uncoverable by a negligent amount of additional digging.

Figure 3:
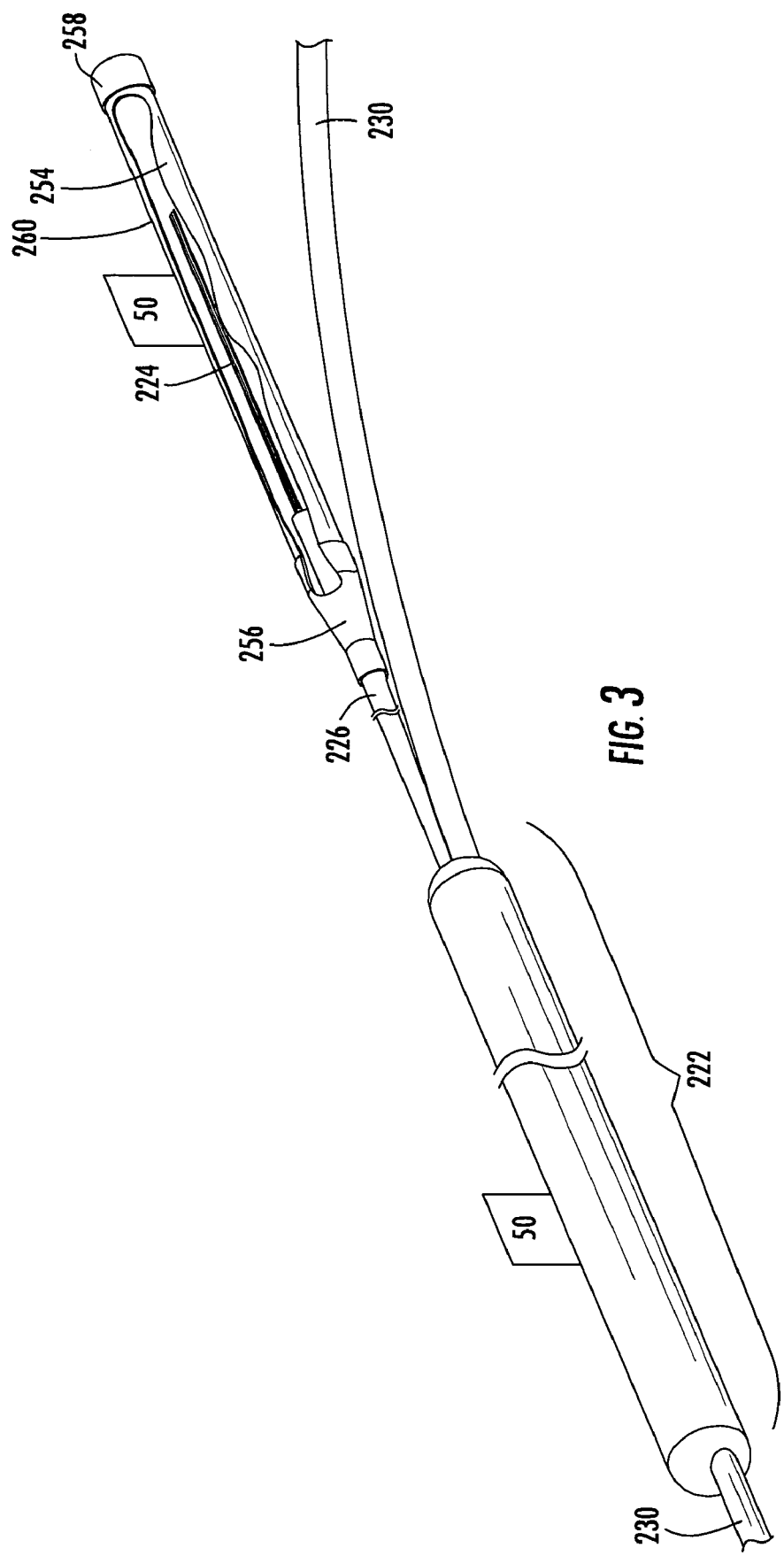
FIG. 3 is a perspective view of a mid-span access location having a tether attached to a distribution cable.

Referring to FIG. 3, a perspective view of a typical mid-span access location 222 having a tether 226 attached to the distribution cable 230 that terminates in a plurality of optical fibers 224 optically connected to the preterminated optical fibers 228 of the distribution cable and housed within a crush resistant tube 254 is shown. As described above, the tether 226 has a predetermined length preferably not exceeding about 100 feet, more preferably not exceeding about 25 feet, and more preferably between about 12 and about 15 feet. The tether 226 ensures that the preterminated optical fibers 224 may be placed in any desired location regardless of the placement of the mid-span access location 222 after deployment. The tether 226 permits the distribution cable assembly 220 to be pre-engineered and manufactured without absolute accuracy in the placement of the mid-span access locations 222. Although not shown, the tether 226 is typically securely attached to the distribution cable 230 via strapping, lashing, clamps or other like fasteners at predetermined intervals along the length of the tether 226. The distribution cable 230 and the tether 226 are lashed together in the factory and wound onto a reel as a complete distribution cable assembly 220. The mid-span access location 222, the distribution cable 230 and the tether 226 are sufficiently flexible so as to permit the distribution cable assembly 220 to be wound onto a cable reel, shipped and deployed through conduit or through conventional aerial lashing equipment. The lashings remain in place during deployment of the distribution cable assembly 220 and may be removed following deployment when the mid-span access location 222 is positioned at a desired location and utilized as a distribution or termination point in the fiber optic communications network. The mid-span access location 222 is also commonly called the mid-span access point (MAP), and the terms are used interchangeably herein.

In the embodiment shown in FIG. 3, the tether 226 terminates in one or more splice-ready optical fibers 224 disposed within a protective tube 254 such that the optical fibers may be dressed and spliced in the field to respective optical fibers of a fiber optic branch cable or a fiber optic drop cable. The protective tube 254 is typically removed and replaced by a conventional outside plant terminal, such as an aerial closure, to house and protect the spliced optical connections. The protective tube 254, preferably designed to withstand expected crush forces, is secured to the tether 226 by a heat deformable material 256, such as conventional heat shrink. The heat deformable material is also operable for providing a smooth transition between the different outer diameters of the sheath of the tether 226 and the protective tube 254, thus aiding deployment through conduit or aerial lashing equipment. An end cap 258 may be used to seal the end of the protective tube 254 and protect the optical fibers 224 from the outside environment. An AEFELT 50 is positioned at mid-span access location 222 and/or a network access point 260. As used herein, and with reference to non-connectorized cable assemblies, "mid-span access point(s)" refers to the location(s) where optical fibers are accessed from the cable and "network access point(s)" refers to the location(s) of the to-be-spliced ends of the preterminated fibers. Also, as used herein and as stated above, the term "at" refers both to being exactly at a location and being within an operable distance from the location.

Figure 3A:
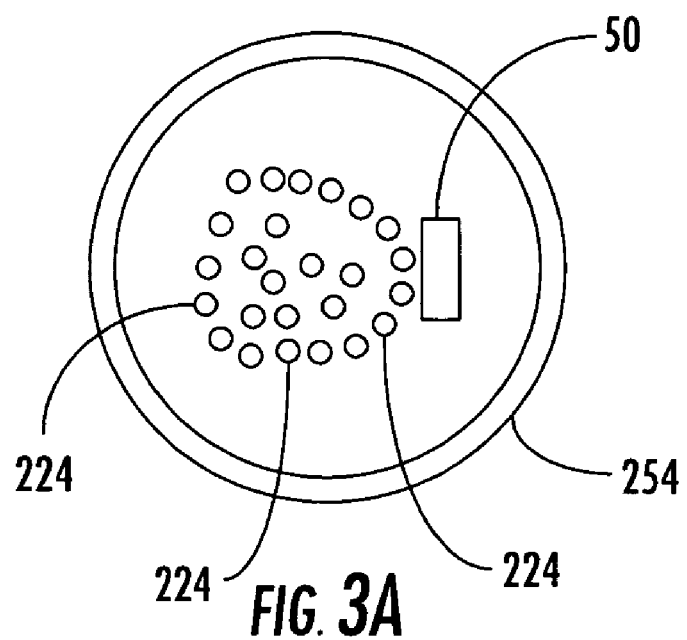
FIG. 3A is a cross-sectional view of the mid-span access location in accordance with one embodiment of the invention, wherein the AEFELT is located adjacent to optic fibers.
Figure 3B:
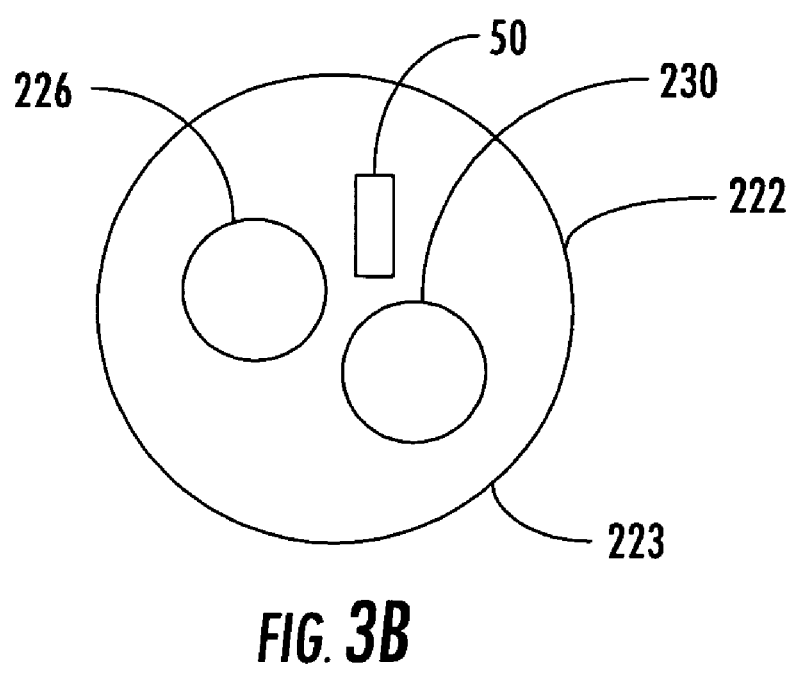
FIG. 3B is a cross-sectional view of the mid-span access location including an overmolded body formed from a flexible material encapsulating the mid-span access location.

FIG. 3A is a cross-sectional view of protective tube 254 in accordance with one embodiment of the invention, wherein AEFELT 50 is located next to optic fibers 224. In an exemplary embodiment, AEFELT is in contact with at least one optic fiber. FIG. 3B is a cross-sectional view of mid-span access location 222 including an overmolded body 223 formed from a flexible material encapsulating the mid-span access location 222. AEFELT 50 is located interior to the overmolded body along with cable 230 and a portion of tether 226. In an exemplary embodiment, the mid-span access is accessed and a tether connected to the MAP in accordance with the teachings of co-pending application Ser. No. 10/852,427 filed May 24, 2004 titled Distributed Cable Assembly Having Overmolded Mid-span Access Location, the AEFELT 50 is positioned next to the connection of the tether to the MAP, and the overmolded body 223 is formed from a flexible material encapsulating the mid-span access location 222 as also taught in Ser. No. 10/852,427.

Figure 4:
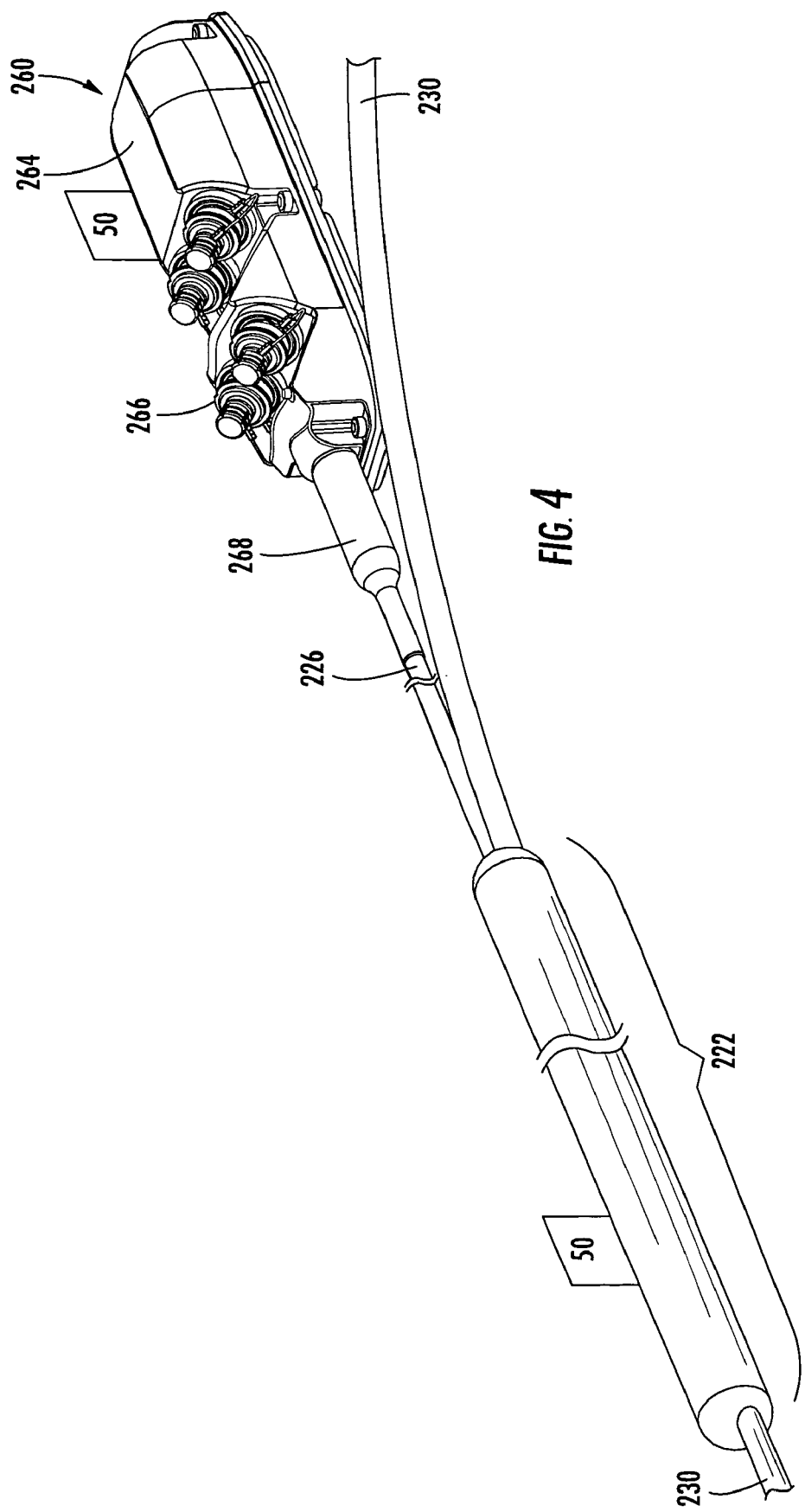
FIG. 4 is a perspective view of another mid-span access location having a tether attached to the distribution cable and a multi-port.

Referring to FIG. 4, a perspective view of another typical mid-span access location 222 having a tether 226 attached to the distribution cable 230 is shown. In this embodiment, the tether 226 terminates in a multi-port optical connection terminal 264 that provides access to one or more preterminated, and preferably pre-connectorized, optical fibers optically connected to the preterminated optical fibers 228 of the distribution cable 230. The multi-port optical connection terminal 264 may be used to readily interconnect optical fibers of one or more connectorized fiber optic branch or drop cables with the preterminated optical fibers 228 of the fiber optic distribution cable 230 at a desired location in a fiber optic communications network. In various embodiments, the multi-port optical connection terminal 264 may be connected to one or more drop cables extending from a downstream location, such as a subscriber premises. The multi-port optical connection terminal 264 allows a field technician to readily connect, disconnect or reconfigure one or more drop cables extending to subscriber premises without disturbing the remaining branch or drop cables.

The multi-port optical connection terminal 264 comprises a base and a cover, with each preferably made of a lightweight and rigid material, such as aluminum or plastic. The embodiment shown in FIG. 4 comprises four optical connection nodes 266 for interconnecting preterminated optical fibers 228 of the distribution cable 230 to multiple branch or drop cables. In one embodiment, each optical connection node 266 comprises an opening for accessing the splice-ready optical fibers 224 of the tether 226. In another embodiment, each optical connection node 266 is a connector port operable for receiving one or more preterminated optical fibers 224 of the tether 226 on the inside of the connector port and a connectorized fiber optic branch or drop cable on the outside of the connector port. As used herein, the term "optical connection node" is intended to broadly include an opening through which the optical fibers 224 (splice-ready or connectorized) of the tether 226 are optically connected to the optical fibers of a branch or drop cable. In various embodiments, the optical connection node 266 may also include a factory-installed connector adapter sleeve (not shown) for aligning and maintaining mating connectors in opposing physical contact. Preferably, the optical connection node 266 further provides an environmental seal at the optical connection between the optical fibers 224 of the tether 226 and the branch or drop cable. The optical connection node 266 may also serve to transfer any tension load on the cables to the housing of the multi-port optical connection terminal 264. While four optical connection nodes 266 are shown, it is envisioned that the multi-port connection terminal 264 may have any size or shape suitable for holding one or more optical connector nodes 266. In addition, the multi-port optical connection terminal 264 defines a cable port operable for receiving the tether 226. A heat deformable material 268 may be used to provide a seal and a smooth transition between the different outer diameters of the tether 226 and the cable port of the multi-port optical connection terminal 264.

In accordance with one embodiment of the invention, an AEFELT 50 is positioned at mid-span access location 222 and/or a network access point 260. It is contemplated that the benefits of the invention accrue to all cable assemblies including all tethered applications as described in co-pending application Ser. No. 10/852,427 filed May 24, 2004 titled Distributed Cable Assembly Having Overmolded Mid-span Access Location, as well as un-tethered applications. Although, FIG. 4 illustrates AEFELT 50 positioned on the body of the NAP 260, in one embodiment, AEFELT 50 is positioned within a cavity within terminal 264. AEFELT 50 can also be positioned on or under the heat deformable material 268. Also AEFELT 50 can be positioned next to an optic fiber inside NAP 260. It is contemplated that AEFELT 50 can be positioned anyplace that facilitates unburying NAP 260 upon locating AEFELT 50.

Figure 5:
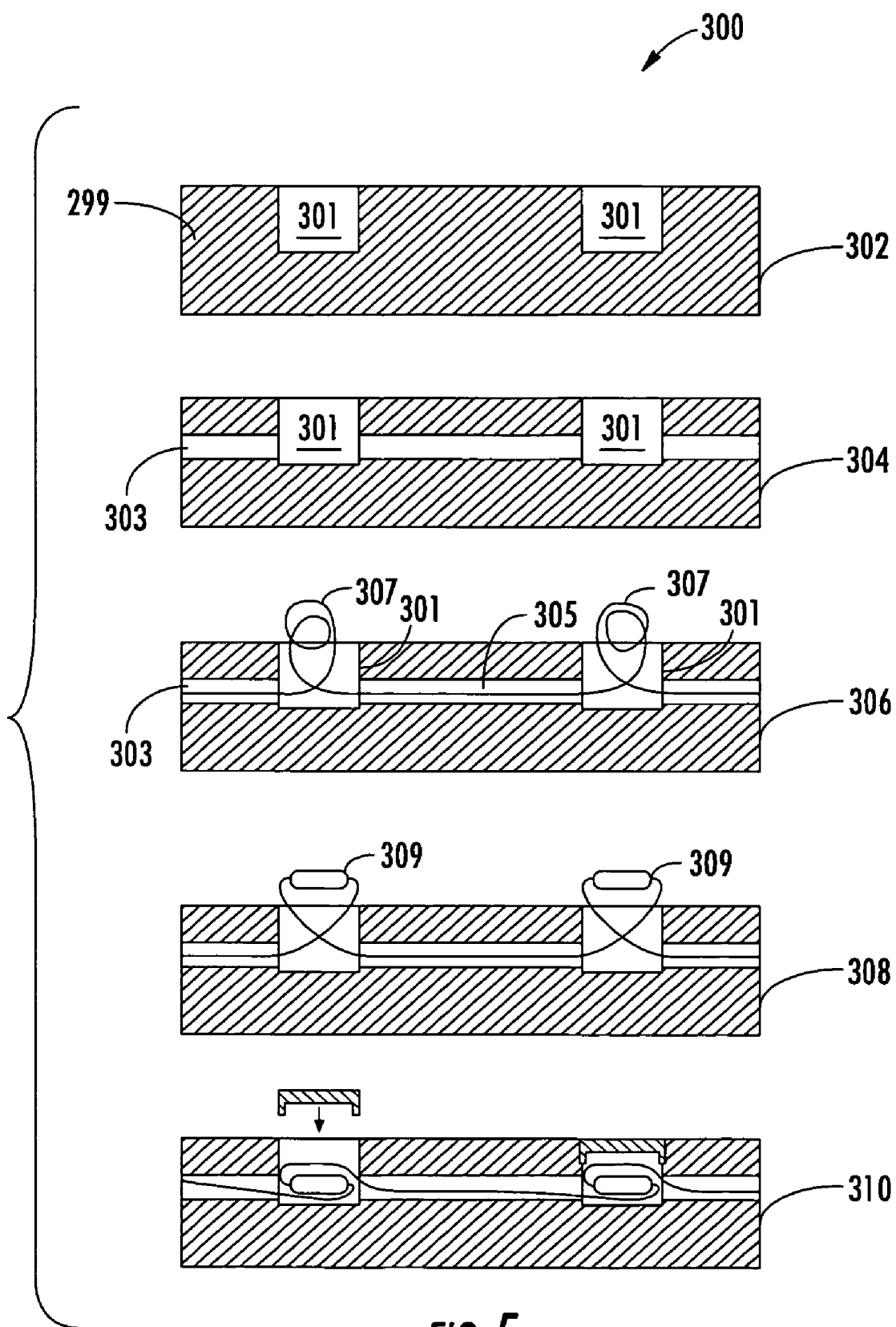
FIG. 5 illustrates a conventional method for laying cable.

FIG. 5 illustrates a conventional method 300 for laying cable. The method includes digging hand holes 301 in the ground 299 at step 302, and then digging a duct 303 at step 304. Duct 303 is typically fabricated by horizontal boring. A cable 305 is then placed in the duct 303 with slack loops 307 in the hand holes 301 at step 306. A plurality of Network Access Point (NAP) closures 309 are attached to the cable 305 at step 308, and at step 310, a cover 312 is used to cover the hand holes 301. It is desirable to have the NAP closures 309 installed in the factory and bore duct 303 first and then dig hand holes as needed when access to a particular NAP closure 309 is desired. However, the duct 303 bore is not always straight. In other words, duct 303 is sometimes at least partially serpentine and the travel distance between adjacent hand holes 301 can be different traveling in a linear path above ground than traveling though duct 303. Although illustrated with cover 312 used after closures 309 are in place, it is known to create slack loops 307 at step 306 and cover slack loops 307 with cover 312. Closures 309 are then used at a later time.

Figure 6:
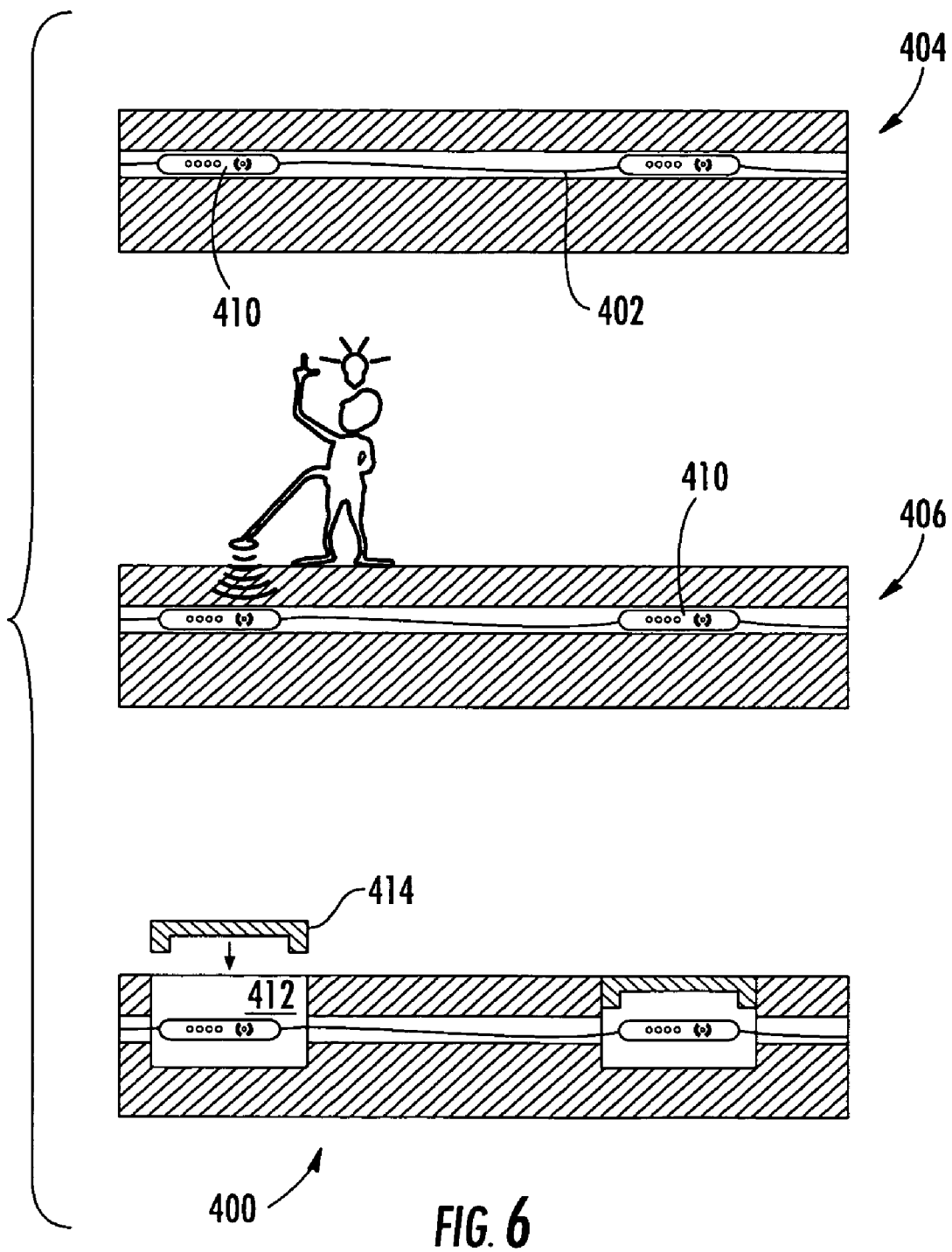
FIG. 6 illustrates a method of facilitating the locating of an at least partially buried fiber optic cable.

FIG. 6 illustrates a method 400 of locating an at least partially buried fiber optic cable 402. The method includes obtaining a fiber optic cable with at least one associated AEFELT and placing the cable underground such that at least one AEFELT is buried underground at step 404. The method 400 also includes locating the cable using the at least one buried AEFELT at step 406. In an exemplary embodiment, the AEFELT is a commercially available Radio Frequency Identification (RFID) tag and is embedded in a NAP closure 410. Typically, in a green field application, there is a temporal disconnection between burying the cable and locating the cable using the at least one buried AEFELT.

Typically, but not always, a content provider buries cable 402, and does not locate the NAP until the provider receives a customer service request. For example, a customer residing in the vicinity of the NAP inquires about service, or orders service, and the content provider than locates the NAP. A cavity 412 (e.g., a hand hole) is dug to access the NAP and a cover 414 may be placed to cover the cavity 412. The cover 414 may be below ground, above ground, or at grade. By accessing the NAP, the customer is able to be connected to a network. The connection can be via a splice (with reference to FIGS. 1 and 3) or using a pre-connectorized solution (FIGS. 2 and 4). In a plug and play solution, the connection is to a pre-connectorized NAP and extends to a pre-connectorized NID (Network Interface Device) located at the customer's residence. As used herein the term "pre-connectorized" refers to items manufactured with a connector and is used interchangeably with the term "factory installed". For example, "a pre-connectorized NAP" is identical in meaning to "factory installed connector(s) at a network access point."

Also as used herein, the term "RFID" refers to technologies that use radio waves to automatically identify people or objects. There are several methods of identification, but the most common is to store a serial number that identifies a person or object, and perhaps other information, on a microchip that is attached to an antenna (the chip and the antenna together are called an RFID transponder or an RFID tag). The antenna enables the chip to transmit the identification information to a reader. The reader converts the radio waves reflected back from the RFID tag into digital information that can then be processed. There are also chipless forms of RFID tags that use material to reflect back a portion of the radio waves beamed at them. Additionally there are active, passive, and semi-active RFID tags. An active tag is an RFID tag that has a transmitter to send back information, rather than reflecting back a signal from a RFID reader, as a passive tag does. Most active tags use a battery to transmit a signal to a reader. However, some tags can gather energy from other sources. A passive tag is an RFID tag without its own power source and transmitter. When radio waves from the reader reach the chip's antenna, the energy is converted by the antenna into electricity that can power up the microchip in the tag. A semi-passive tag is similar to an active tag, but the battery is used to broadcast a signal to the reader but not to run the microchip's circuitry. Some semi-passive tags sleep until they are woken up by a signal from the reader, which conserves battery life.

Alternatively, the AEFELT is a device other than an RFID tag. As used herein the term "alternating electromagnetic field emitting locating transponder (AEFELT)" refers to devices which emit either through original generation or reflection an alternating electromagnetic field and not to a steady state magnetic field generator such as a magnet. Examples of an AEFELT other than an RFID tag are cellphones, radio transponders, radio beacons, and pagers. Also, inside the NAP closure are typically both NAPs 144, 260, and MAPs 122, 222. The AEFELT can be placed at a NAP 144, 260, a MAP 122, 222, a NAP closure 309, and/or a NAP closure 410. Also as used herein a "drop cable" refers to the line that connects a premise to a NAP.

In other embodiments, the RFID tag 50 includes information and is useful for purposes other than locating the tag 50. For example, in one embodiment, the RFID tag 50 is located at the NAP and/or includes data about the NAP, such as, for example, but not limited to, the type of connectors used, such as, for example, but not limited to, SC, LC, FC, ST, SC/DC, MT-RJ, MTP, and MPO connectors. Also, the RFID tag 50 may include other data, such as number of connectors, fiber type, cable type such as, for example, but not limited to, ribbon cable, loose tube cable, and tight buffered cable. In one embodiment, the RFID tag is located at the MAP and/or contains data about the MAP such as fiber type, number of fibers, and/or splice information such as cleave angle, for example.

Figure 7:
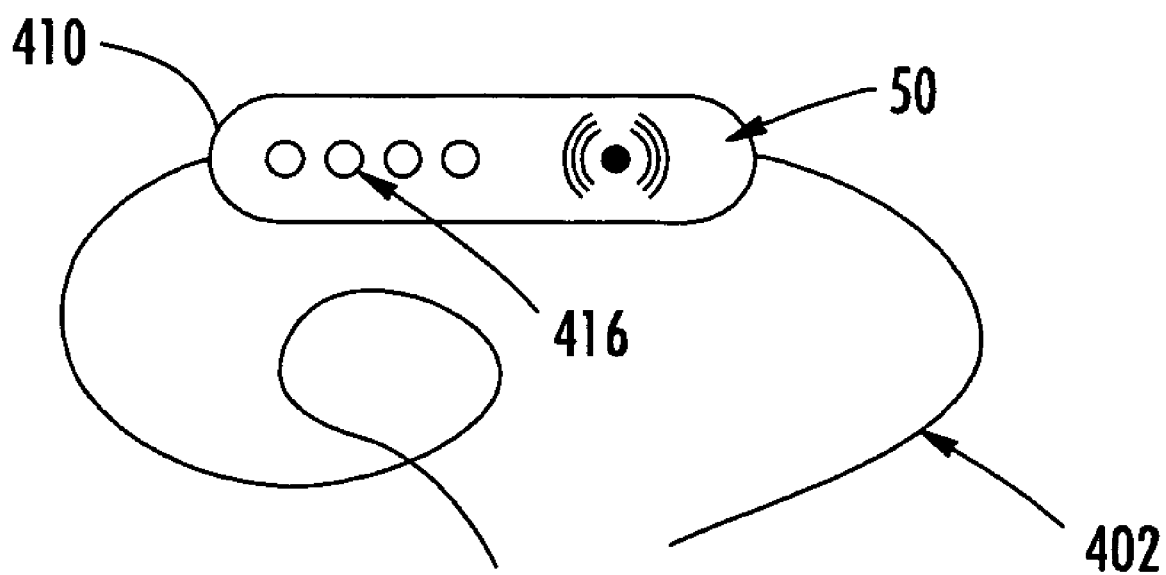
FIG. 7 is a detailed illustration of a cable and a Network Access Point.

FIG. 7 is a detailed illustration of cable 402 and NAP 410. Nap 410 includes at least one optical fiber connector 416 and a RFID tag 50. In an exemplary embodiment, the NAP is fabricated at least partially from polyurethane and the RFID 50 tag is embedded in the polyurethane. Other attachment methods, besides embedding a RFID in the polyurethane, include adhesively attaching the RFID, mechanically attaching the RFID using fasteners such as a screw of a cable tie for example. Although, illustrated with a row of connectors in FIG. 7, it is contemplated that the benefits of the invention accrue to all NAPs, MAPs, and NAP closures regardless of configuration. Additionally, the RFID can be located on the cable at the NAP or MAP or one RFID can identify a NAP while another RFID identifies the MAP associated with that NAP.

Figure 8:
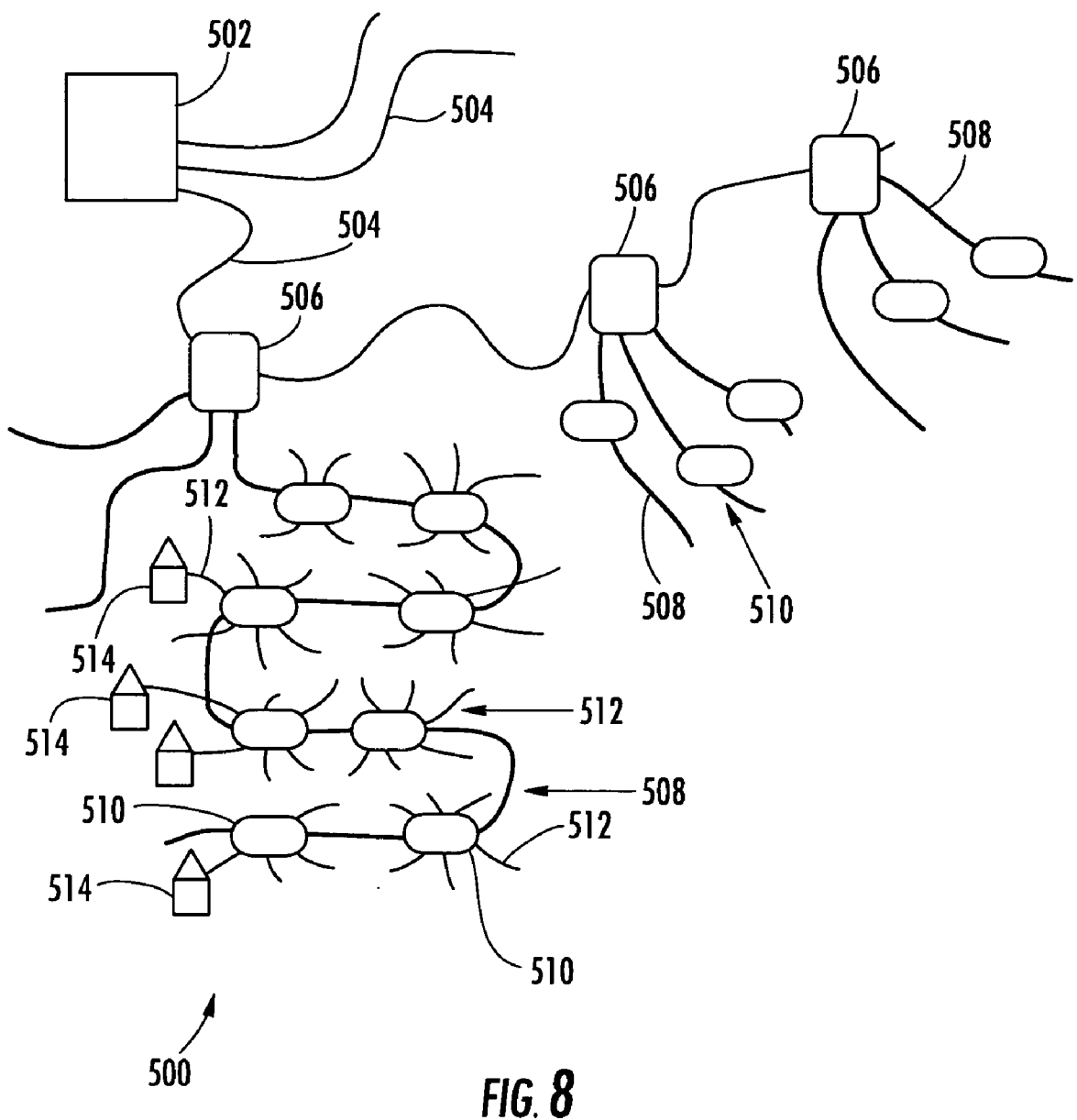
FIG. 8 illustrates an optical fiber network including a Central Office/Head End (CO/HE).

FIG. 8 illustrates an optical fiber network 500 including a Central Office/Head End (CO/HE) 502 and a plurality of feeder cables 504 connected to the CO 502. Each feeder cable 504 is connected to a plurality of Local Convergence Points (LCPs) 506 which are connected to a plurality of distribution cables 508. Each distribution cable includes a plurality of NAPs 510. Between NAPs 510 and a plurality of structures (i.e., premises) are drop cables 512, Although described from the CO 502 to the structures 514, the actual fabrication of network 500 can be in any temporal order. For example, a distribution cable 508 including at least one AEFELT may be buried, and then later, located using the AEFELT. After being located, the distribution cable is connected to a LCP 506. Additionally, the feeder cables can be pre-buried in a similar manner.

An AEFELT can be used to locate any of the feeder cables 504, the LCPs 506, the distribution cables 508, the NAPs 510, and/or the drop cables 512. For example, an RFID tag 50 can be associated with both ends of a cable and the cable completely buried. Then the ends can be found for connection to other cables by use of the RFID tag. Additionally, any cable slack storage locations in network 500 can be easily located using an associated AEFELT. As used herein a "cable slack storage" location refers to any location where at least one loop of cable is stored such that the loop can be later unlooped and the resulting extra length of cable used.

Also, a craftsperson can correct maps and databases that have incorrect information. For example, a craftsperson obtains from location information (e.g., a map or database) an original location for a buried cable with an associated RFID tag and then uses the associated RFID to actually locate the cable. If the actual location is different than the original location, then the craftsperson can update the location information to accurately reflect the actual location. To compare the actual location to the original location, the craftsperson can use a global positioning satellite device to ascertain the actual location. Also, sometimes the location information may be in relation to a landmark (e.g., 10 feet from a roadway), and the craftsperson can measure the distance the actual location is to the landmark to determine if the actual location is the same as the original location. Accordingly, through updates to a database and/or associated maps, an average repair time may be reduced because of a reduction in time a craftsperson spends locating the buried cable. Additionally, by knowing where a cable is buried, one knows where the cable is not buried and this leads to a faster uncovering of the cable. For example, and with respect to constructing a large hand hole, one can use a backhoe to trench close to the cable and then use a hand shovel when very close to the cable.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed is:

1. A method of laying an at least partially buried fiber optic cable having at least one predetermined access location along the fiber optic cable for providing access to at least one pre-connectorized optical fiber, said method comprising:
    placing a fiber optic cable with at least one associated alternating electromagnetic field emitting locating transponder (AEFELT) underground such that at least one AEFELT is buried underground,
    wherein the at least one AEFELT is proximate at least one of the predetermined access location of the fiber optic cable and the at least one pre-connectorized optical fiber.

2. A method in accordance with claim 1 further comprising locating the cable using the at least one buried AEFELT.

3. A method in accordance with claim 1 wherein the AEFELT comprises a Radio Frequency Identification (RFID) tag.

4. A method in accordance with claim 3, further comprising:
    digging a cavity at the located RFID tag; and
    covering the cavity.

5. A method in accordance with claim 1 wherein the AEFELT proximate at least one of the predetermined access location of the fiber optic cable and the at least one pre-connectorized optical fiber contains data regarding the at least one of the predetermined access location of the fiber optic cable and the at least one pre-connectorized optical fiber.

6. A method in accordance with claim 3 wherein said locating the cable comprises locating the RFID tag proximate at least one of the predetermined access location of the fiber optic cable and the at least one pre-connectorized optical fiber in response to a service order.

7. A method in accordance with claim 6 further comprising:
    accessing the at least one pre-connectorized optical fiber located RFID tag; and
    making a fiber optic connection from the at least one pre-connectorized optical fiber to a residence.

8. A method in accordance with claim 7 wherein said making a fiber optic connection comprises making a fiber optic connection from the at least one pre-connectorized optical fiber to a network interface device (NED) located at the residence.

9. A method in accordance with claim 3 further comprising creating a slack storage location locatable by using at least one of the RFID tags.

10. A fiber optic distribution cable assembly, comprising:
    a distribution cable comprising a plurality of optical fibers and having at least one predetermined mid-span access location positioned along the length of the distribution cable;
    at least one optical fiber of the distribution cable accessed and terminated from the distribution cable at the mid-span access location; and
    an alternating electromagnetic field emitting locating transponder (AEFELT) positioned at the accessed optical fiber, the AEFELT configured to be operable at least four feet underground.

11. An assembly in accordance with claim 10 wherein alternating electromagnetic field emitting identification comprises a Radio Frequency Identification (RFID) tag.

12. An assembly in accordance with claim 11 further comprising a tether comprising a first end attached to the distribution cable at the mid-span access location and at least one optical fiber optically connected to the at least one terminated optical fiber of the distribution cable, wherein the RFID is positioned at the tether.

13. An assembly in accordance with claim 12 further comprising a plurality of RFIDs each associated with a respective tether.

14. An assembly in accordance with claim 11 wherein the RFID comprises a passive RFID.

15. A method of updating location information of a fiber optic cable having at least one predetermined access location along the fiber optic cable for providing access to a tether comprising a first end attached to the fiber optic cable at the predetermined access location, said method comprising:
    receiving an original target location of a desired fiber optic cable including an alternating electromagnetic field emitting locating transponder (AEFELT), wherein the AEFELT is proximate at least one of the predetermined access location of the fiber optic cable and the tether;
    locating the cable AEFELT at an actual location; and
    updating the location information when the actual location was not the received original target location.

16. A method in accordance with claim 15 wherein said updating further comprises updating the location information wherein the location information comprises a database.

17. A method in accordance with claim 15 wherein said updating further comprises updating the location information wherein the location information comprises a map.

18. A method in accordance with claim 15 wherein to compare the original target location with the actual location, said method further comprises using a global positioning satellite (GPS) to ascertain the actual location.

19. A method in accordance with claim 15 wherein to compare the original target location with the actual location, said method further comprises measuring from a landmark to the actual location.

20. A fiber optic distribution cable assembly, comprising:
a distribution cable comprising a plurality of optical fibers and having at least one predetermined mid-span access location positioned along the length of the distribution cable;
at least one optical fiber of the distribution cable accessed and terminated from the distribution cable at the mid-span access location;
a tether comprising a first end attached to the distribution cable at the mid-span access location and at least one optical fiber optically connected to the at least one terminated optical fiber of the distribution cable;
an alternating electromagnetic field emitting locating transponder (AEFELT) positioned generally at the mid-span access location; and
an overmolded body formed from a flexible material encapsulating the mid-span access location including the AEFELT.

* * * * *